April 24, 1934.   H. C. KUHNER   1,956,239
MEAT BAR
Filed Dec. 1, 1932

INVENTOR.
HENRY C. KUHNER
BY
ATTORNEY.

Patented Apr. 24, 1934

1,956,239

UNITED STATES PATENT OFFICE 1,956,239

MEAT BAR

Henry C. Kuhner, Muncie, Ind., assignor to Kuhner Packing Company, Muncie, Ind., a corporation of Indiana Application December 1, 1932, Serial No. 645,193

5 Claims. (Cl. 99—11)

This invention relates to improved methods of making meat-cheese loaf products. The advantages desired in a meat loaf or bar of the above description are that it may readily lend itself to being sliced and that it may be sufficiently homogeneous in structure that the severed slice or slab will not easily become disintegrated, that is to say that the meat portions and the cheese portions thereof will not come apart.

To provide a meat bar wherein the above named advantages are embodied, is the object of this invention. The objects of the invention are accomplished by the new method of preparing, and by the new process of combining of the constituent portions of the bar, which are described in the following specification, and which are defined in the appended claims.

In the accompanying drawing.

The major portions of my improved meat bar may consist of beef, pork and veal composition or the like. Nuts, such as pistachios, also olives and like delicacies may be included.

Claim is not made in this application, as to there being novelty in the use of meat portions and of cheese portions in the making of a food product, nor in processes of the preparing of the said portions separately; nor is any claim made herein as to there being novelty in the fact that same are pressed into form, and then subjected to cooking temperature. I do wish to make it plain herein however, that in the art of making a food product whose essential parts consist of meat portions and cheese portions, I believe myself to be first to have so constituted the bar that it is of close grain, firm and uniform structure and that in the slicing of said bar, each slab, as severed, is of unitary or homogeneous structure, the cheese portion thereof being not too easily separable from the meat portions.

Figure 1:
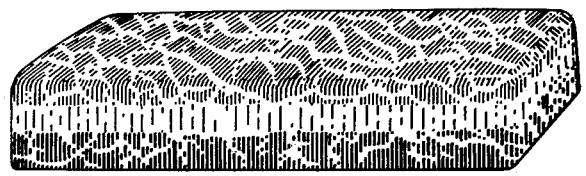
Figure 1 is a perspective view illustrating the appearance of a meat bar of conventional proportions, as prepared in accordance with my invention.
Figure 2:
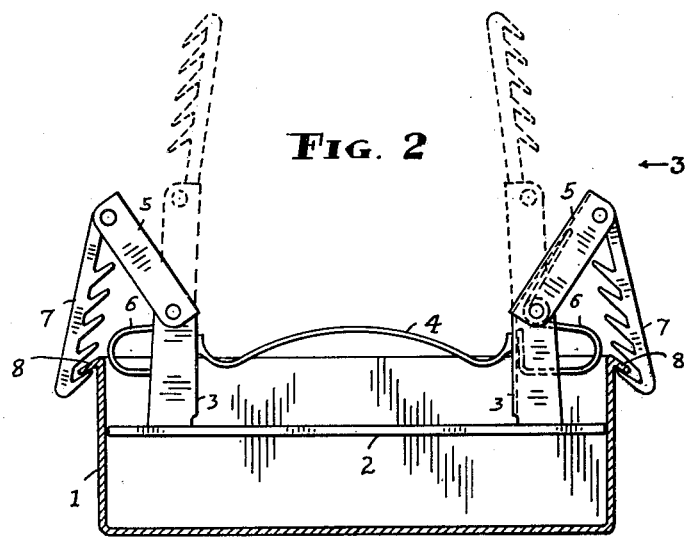
Figure 2 is a vertical longitudinal central sectional view of a mold in which a bar of this character is formed.
Figure 3:
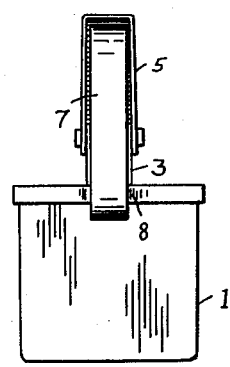
Figure 3 is an end view, as seen in the direction of arrow 3 in Figure 2.

My new combination meat and cheese bar may be formed in a press mold of the type illustrated in Figures 2 and 3. The mass is placed in the rectangular mold 1 and the closure device in which is embodied the press plate 2 is superposed thereon. The said press plate 2 has spaced uprights 3 and 3, and handle 4. Pivotally connected to the upper ends of connector arms 5 and 5 whose lower ends are pivotally connected to the said uprights, (and which said connector arms are urged toward each other by spring members 6 and 6) are toothed grip links 7 and 7. These toothed grip links are adapted to engage the lugs 8 and 8 which are provided at the upper edges of the ends of the said mold.

After the depositing in the mold of the food composition in desired quantity, the press plate is lowered, the food mass thereby being compressed. The toothed links 7 and 7 will have become engaged with the lugs 8 and 8 whereby any tendency of the press plate to yield its position is prevented. The mold with its enclosed and compressed mass is then subjected to the process of cooking the food mass. To remove the press plate, the connector arms are pressed downwardly, the toothed links being thereby detached from the lugs 8 and 8. The said connector arms, together with the toothed links, are swung to the positions indicated by the broken lines. The press plate may now be lifted from the mold.

The foregoing description of a mold and the closure device therefor, and the manner of using same, is prefatory to the statement and description of my invention, it being understood that my invention may be practiced in connection with the use of a mold of any description in which meat bar compositions are prepared.

As heretofore stated, a problem met with, in attempts to embody cheese in the mass, has been that of obtaining a satisfactory union between the cheese portion and the meat portion. A bar of preferred form is relatively long, and is rectangular in cross section. Cheese being of more or less perforate formation, as it happens, lends itself especially to my process of uniting it with the meat portion or portions of the bar.

The method of preparing my improved food product consists of treating the surfaces of the cheese layer to render it susceptible of becoming integrated with the meat portions, then depositing said cheese layer and the meat portions in a mold and subjecting same to pressure, and then subjecting the mass so constituted, to cooking temperature.

The treatment which is applied to the cheese is that of applying a coating of powdered gelatine. The process of making the bar consists of laying upon the interior surfaces of the mold, a sheet of light textile fabric such as muslin, then laying on said muslin sheet, a caul (preferably the veil of fat from slaughtered animals), then depositing a layer of meat composition, then a layer of cheese which has been treated as above described, then a layer of meat composition. The caul portions free, are folded over the top surface of the mass, and similarly the fabric sheet is folded over the caul. The closure and pressure device is then applied, the mold thereby being closed, and the food product content being compressed to the desired degree. The mold with the mass so compressed and contained therein is submerged in steam and hot water whose temperature is about one hundred eighty degrees Fahrenheit and after about two hours it is then subjected to a cooling temperature of about thirty-two to thirty-eight degrees Fahrenheit.

The press plate is then lifted from the mold and the product contained within the fabric is removed from the mold. The fabric sheet is then removed. The loaf so formed is of uniformly close grain texture. The caul having become integrated with the body composition of the bar it functions as an effective shielding envelope and it also firms the body structure against tendency to yield its true form under all stresses incident to the handling of the product in the merchandising thereof or in the handling of same preparatory to its being used.

In the food-product bar provided by my invention, the cheese layer is united throughout its extent from end to end of the bar. The bond between the cheese layer and the meat portions is sufficiently tenacious, that each slab as it is severed, is an entirety in which the several layers or portions do not become easily separated. It will be understood that my invention lends itself to the preparation of bars of divers forms and dimensions, and that the meat-composition layers and cheese layers, may be varied in number, arrangement, and bulk.

What I claim as my invention, is—

1. In the preparing of meat bar in which is embodied cheese, treating the cheese with powdered gelatine preliminary to its being combined with the meat, then combining it with the meat, then enveloping the combination in a caul and, subjecting the mass and the enveloping caul thereof to pressure, and then to cooking, whereby close adhesion between the meat and the cheese, and between the caul and the surfaces of the loaf mass, is effected.

2. In the preparing of meat product of the kind described comprising meat portions and cheese portions, the treating of the cheese portion with a gelatinous substance whereby adhesion is established between the meat portion and the cheese portion when the mass is subjected to pressure and to cooking temperature, enveloping the said combination with a caul, then subjecting the said enveloped mass to pressure, and then to cooking.

3. A method of constituting a meat loaf consisting of meat and cheese which said method consists of laying upon the interior surfaces of the mold a sheet of light textile fabric, then laying upon said sheet a caul, then depositing a layer of meat composition, then a layer of cheese which has been treated with gelatine to render same adhesive, then depositing a layer of meat composition, then folding the free portions of the caul over the top surface of the mass and similarly the free portions of the fabric over the caul, then compressing the mass in a closed mold and subjecting the mold and its contents to a temperature of 180 degrees Fahrenheit more or less and then subjecting it to a cooling temperature of 36 degrees Fahrenheit more or less.

4. A process of making meat bar in which is embodied a cheese layer, consisting of treating of the cheese layer with gelatinous material preliminary to its being combined with the meat portions, then combining it with the meat portions, then enveloping the combination with a caul, and an exterior removable envelope of textile fabric, then subjecting the mass so constituted and enveloped, to pressure, and then to cooking.

5. A process of making meat bar in which is embodied a cheese layer, consisting of treating the cheese layer with gelatinous material preliminary to its being combined with the meat portion, then combining it with the meat portion, then enveloping the combination with a caul, and an exterior removable envelope of textile fabric, then compressing the mass in a closed mold and subjecting same to a cooking temperature, and then subjecting same to a cooling temperature.

HENRY C. KUHNER.